C. C. WALWORTH.
Manufacture of Gas Pipe Fittings.

No. 15,860.

4 Sheets—Sheet 4.

Patented Oct. 7, 1856.

Witnesses:
A. C. Lombard.
J. B. Crosby.

Inventor:
Caleb C. Walworth.

UNITED STATES PATENT OFFICE.

CALEB C. WALWORTH, OF BOSTON, MASSACHUSETTS.

MACHINE FOR FINISHING GAS-PIPE FITTINGS.

Specification of Letters Patent No. 15,860, dated October 7, 1856.

*To all whom it may concern:*

Be it known that I, CALEB C. WALWORTH, of the city of Boston, in the county of Suffolk and State of Massachusetts, have invented a new and Improved Machine for Tapping, Screwing, Boring, and Turning Steam and Gas Pipe Fittings, of which the following is a full, clear, and exact description, taken in connection with the accompanying drawings and the characters of reference thereon marked.

Figure 1:
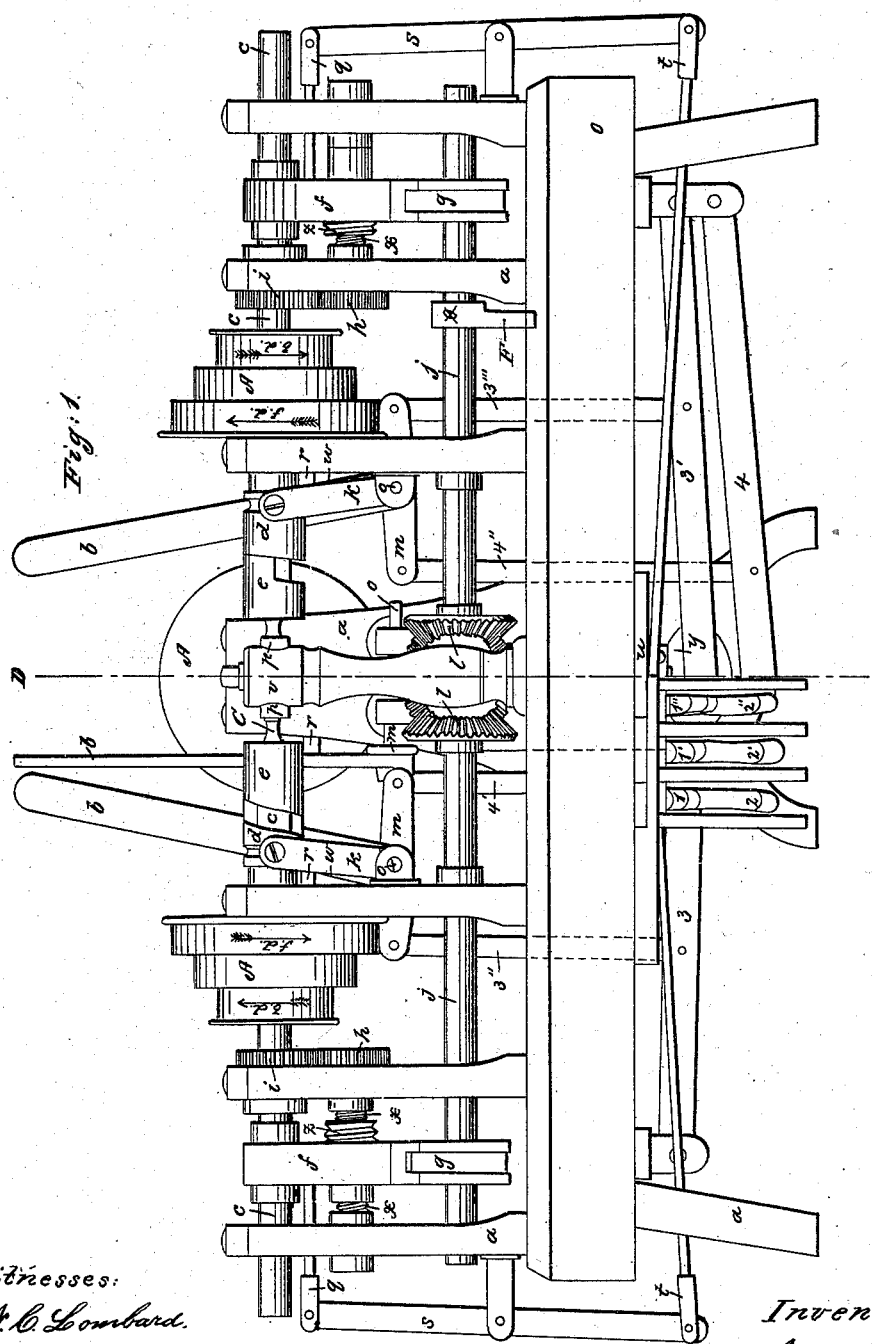
Figure 2:
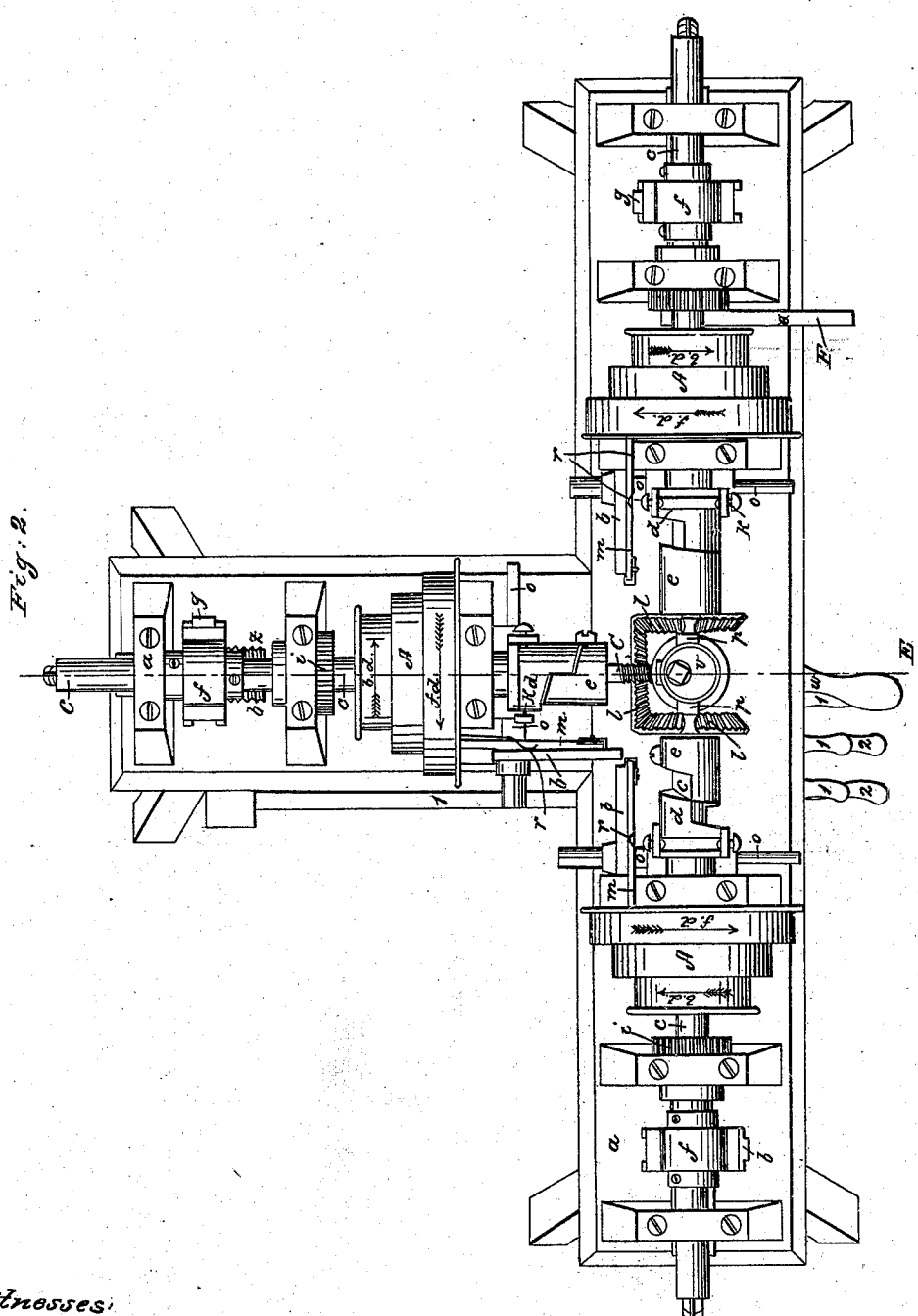
Figure 3:
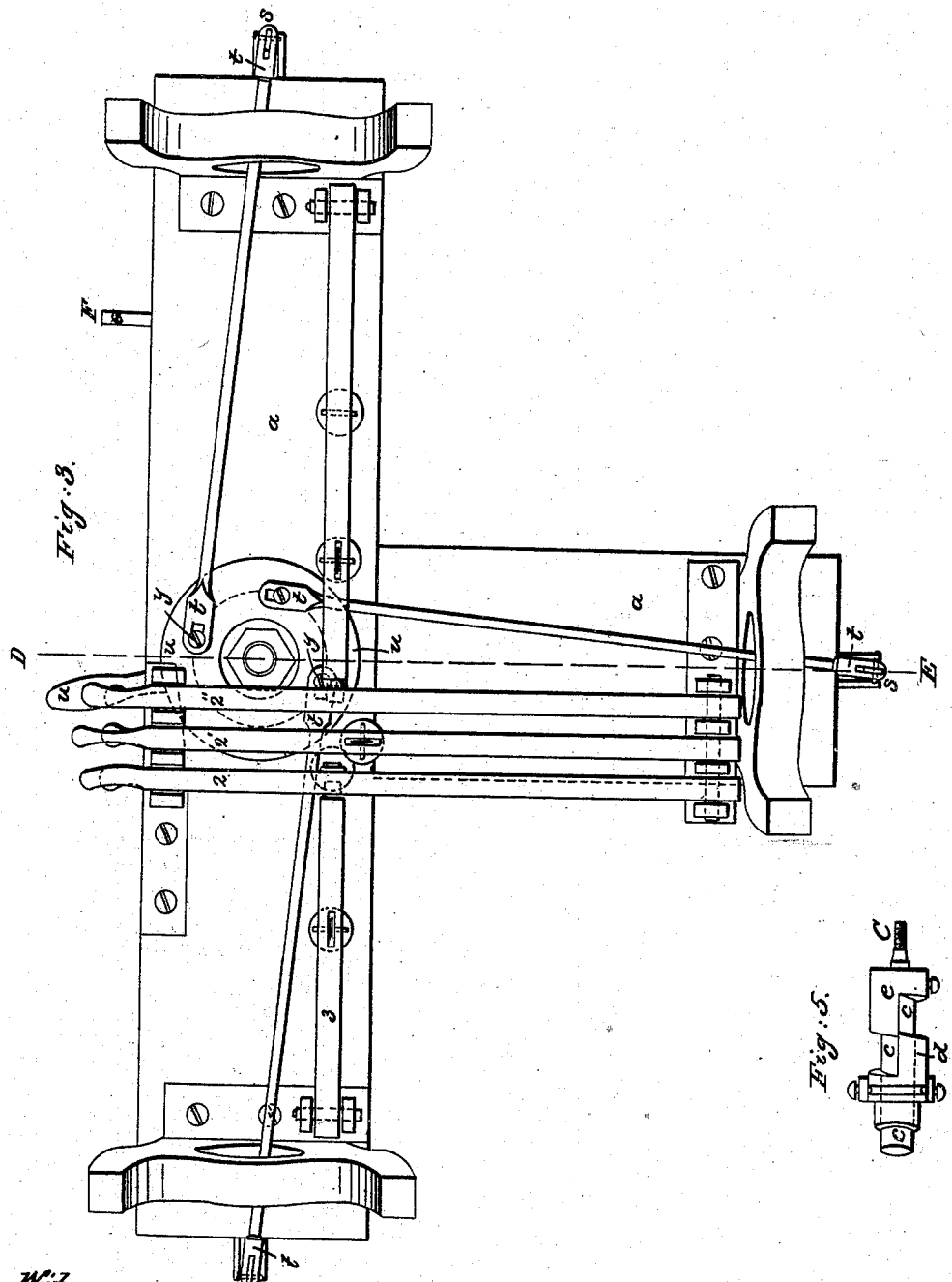
Figure 4:
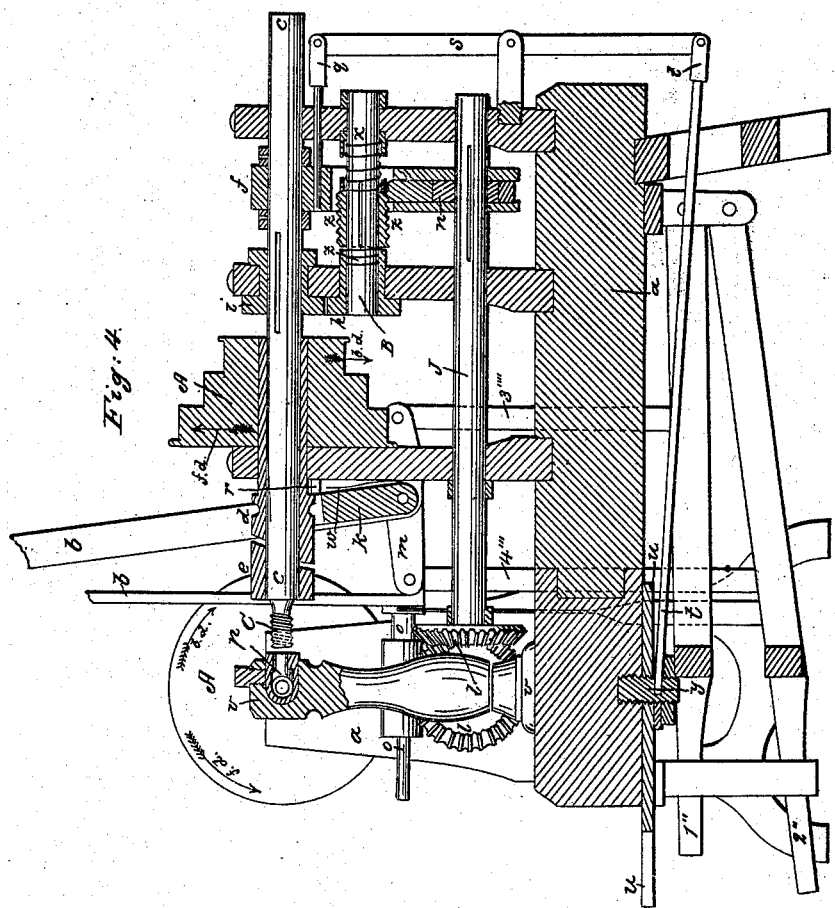

Figure 1 is an elevation of my invention. Fig. 2, a plan. Fig. 3, a reverse plan. Fig. 4, a section on the line (D, E), and Fig. 5 is a detail drawing of the parts ($d$ and $e$) shown also in the other figures of the drawings.

Similar characters refer to similar parts in all the figures of the drawings.

The nature of my invention consists in so arranging and combining the several parts of my machine as to enable me to tap, screw, and perform other operations, in the manufacture of angular steam and gas-pipe fittings, in two or more directions at the same time, whereby, I am enabled to accomplish the same in a more perfect manner and more expeditiously than has been done hitherto.

To enable others, skilled in the art, to make and use my invention I will proceed to describe its construction and operation.

($a$) ($a$) is the framing of the machine; (A) (A) (A) are pulleys through which motive power is applied.

$c$, $c$, $c$, are mandrels, placed at angles to each other corresponding with the angles of the fitting to be manufactured, carrying in one of their ends the taps C, C, C, or other tools.

$e$, $d$, &c., are clutch couplings one of the parts of each, $e$, being adjusted and fixed in its proper position by a set screw, the other part, $d$, being free to move on the mandrel and extending through a bearing in the framing, is firmly secured to the pulley A. The acting faces of each part of the clutch coupling are complex, two of them being in an axial plane but of different lengths and joined together by a face inclined to the axis. Attached to each rocker shaft $o$, is a forked arm $k$ which is moved by the rectilinear movement of the coupling $d$ and communicates a similar movement to the shipper $b$ fixed to the rocker shaft $o$, which shipper acts on any suitable and well known driving and reversing gear such as open and cross belts.

$i$, $i$, $i$ are gears supported in bearings in the framing, and through which the mandrels pass, and which partake of the rotary motion of the mandrels while at the same time a reciprocating movement of the mandrels is permitted by means of the well known device of "feather and spline." Guided between two collars fixed on each mandrel is a crosshead $f$, through which the feeding screw $z$ and shaft B pass, and in the lower extremity of which is a portion of a nut, which is thrown in and out of gear with the screw by means hereafter described. The screw shaft B receives its motion from the gear $h$ meshing into the gear $i$. Each screw while partaking of the rotary motion of the screw shaft is also allowed a rectilinear motion against the springs $x$, $x$, so that when the nut is brought in contact with the screw the pressure of the inclined faces of the threads will move the screw until the threads of each are perfectly engaged.

$u$ is a wrist plate having wrists $y$, $y$, $y$, therein, from which extend the connections $t$, $s$, and $q$, to the crossheads, whereby the mandrels carrying the taps may be simultaneously brought to and withdrawn from their work; one end of the connections $t$ is slotted for purposes to be more fully described hereafter.

1, 1', 1'' and 2, 2', 2'' are levers connected by other levers 3, 3', and 4 and links 3'', 3''', 3'''', 4', 4'', 4''' to opposite ends of the arms $m$, $m$, $m$ on the shipper, $b$, $b$, $b$, whereby all or any of the pulleys are made to run in one or the other direction respectively.

$j$, $j$, $j$, are shafts connected together by means of bevel gears $l$ or other suitable device so that they may work simultaneously. Secured on these shafts so as to partake of their rotary motion and the reciprocating motion of the crossheads and within recesses in the crossheads are eccentrics $n$ encompassed by hoops $g$ on an elongation of which are the portions of nuts which work in the feed screws $z$. A lever is fixed on one of the shafts $j$ and by raising it or depressing it the eccentrics engage the nuts with their respective screws in a perfectly obvious manner.

$r$, $r$, $r$ are springs for assisting the shippers past their neutral or dead points and $w$, $w$, $w$ are springs which serve to keep the couplings and pulleys forward from any accidental tendency to move in the opposite direction.

$v$, is a clamp in which the steam or gas-pipe fitting is secured and is common to all the machines.

A fitting being secured in the clamps the shippers being in a vertical position, which position so acts on the driving and reversing gear that the motion of the pulleys shall be in the direction indicated by the arrows $b\ d$, the lever being raised so that the nut is not engaged in the feed screw, the operation of the machine is as follows:—By moving the wrist plate from left to right all the tools are made to approach the work, depress the lever which raises the nut to engage the screw, now reverse the motion of the pulleys by depressing the levers 2, 2', 2'', which will cause the pulleys to rotate in the direction indicated by the arrows $f\ d$, the nut and screw engaging, the mandrel advances with a rotary motion until the $e$ part of the coupling advances beyond the action of the faces in the axial planes. When the coupling becomes unlocked then the inclined faces of both parts of the coupling act against each other by the continued rotary motion of the mandrel and consequently, the part $e$ being secured from further advance by the engagement of the tool in or against the work, the action of the inclined faces causes the part $d$ and pulleys thereon to move backward, and, by that movement communicated to the shipper, reverses the direction of motion of the pulleys which continue so to revolve, and withdraw the mandrels until the nuts run off the screws, which will now revolve without any further effect. The fitting can be removed from the clamp and another substituted, raise the lever and the operation described may be repeated. To cause any one of the tools to act independently of the remainder the same manipulation of levers must be made as before described with this exception viz: depress only that lever of the series 2, 2', 2'', which ultimately operates the mandrel intended to be used.

It sometimes occurs that some of the taps advance more rapidly in the "fitting" than the others on account of the slipping of the belt or other causes so that the advance tap begins to recede before the others have proceeded sufficiently far; some provision is therefore necessary to permit these opposing motions to prevent undue strain or breakage of the machine; or when the use of one of the machines is to be dispensed with to permit the others to perform their duty. This I accomplish by means of levers or a wrist plate connected to the crossheads or some part having the same rectilinear movement of the taps by rods with their ends slotted so that during the advance or reverse motion of either tap, the slotted end of the connection traverses its wrist without restraint.

Any tool or tools can at any time when advancing be withdrawn, before the action of the inclined faces of the clutch operates to that end, by depressing the lever or levers of the series 1, 1', 1'', connected therewith which action places the shippers in a vertical position reversing the movements.

The amount of rectilinear movement of any tool can be varied and adjusted by adjustment of the part of the clutch fixed on the mandrel, or by adjusting the position of the crosshead, with regard to the feed screw by means of the collars. It is obvious that the pitch of the feed screw should bear a certain relation to the pitch of the thread required to be cut, and also that at the different ends of a fitting different threads and sizes may be cut.

My machine is self tending, that is, the tools proceed to their work, stop and return at the proper time, and all of them being similarly or appropriately adjusted and simultaneously operated insures a uniformity and perfection in the manufacture of angular fittings not otherwise attained.

By means of the devices described the engagement of the nuts with the feeding screws is at the proper times rendered absolutely certain. By means of the wrist plate and connections I am enabled to bring all the tools simultaneously to their work saving time and yet permit any one of the taps to be used without interfering with the operations of the other parts.

I wish to be understood that I do not limit myself to the particular mode of reversing the direction of motion of the pulleys or of feeding the tools or to the precise form of wrist plate and connections herein described as these may be varied without changing the principle of my invention, but have specified that which I have used with success.

What I claim as my invention and desire to secure by Letters Patent is:

The arrangement and combination of the machines operating substantially as herein described in a plane around a common center for the purpose of screwing or tapping different ends of gas pipe fittings at the same time, when connected by means of a wrist plate and slotted connections or their equivalents for the purpose of bringing the taps to their work and yet permit either of them to advance or recede without interfering with the others.

CALEB C. WALWORTH.

Witnesses:
N. C. LOMBARD,
J. B. CROSBY.